US009674863B2

(12) United States Patent
Cheng et al.

(10) Patent No.: US 9,674,863 B2
(45) Date of Patent: Jun. 6, 2017

(54) METHODS AND SYSTEMS FOR DISTRIBUTED COORDINATION

(71) Applicant: Alcatel-Lucent, Paris (FR)

(72) Inventors: Fang-chen Cheng, Randolph, NJ (US); Min Zhang, Swindon (GB); Matthew P J Baker, Canterbury (GB)

(73) Assignee: Alcatel Lucent, Boulogne-Billiancourt (FR)

( * ) Notice: Subject to any disclaimer, the term of this patent is extended or adjusted under 35 U.S.C. 154(b) by 0 days.

(21) Appl. No.: 14/320,952

(22) Filed: Jul. 1, 2014

(65) Prior Publication Data
US 2015/0092684 A1    Apr. 2, 2015

Related U.S. Application Data

(60) Provisional application No. 61/883,545, filed on Sep. 27, 2013.

(51) Int. Cl.
*H04W 72/12* (2009.01)
*H04B 7/024* (2017.01)
(Continued)

(52) U.S. Cl.
CPC ........ *H04W 72/1263* (2013.01); *H04B 7/024* (2013.01); *H04L 5/0035* (2013.01);
(Continued)

(58) Field of Classification Search
None
See application file for complete search history.

(56) References Cited

U.S. PATENT DOCUMENTS

2011/0216817 A1\* 9/2011 Kim ..................... H04B 7/0632
375/224
2012/0176978 A1\* 7/2012 Kim ................. H04W 72/0426
370/329

(Continued)

FOREIGN PATENT DOCUMENTS

CN         102696256 A      9/2012
WO    WO-2011083774 A1     7/2011

OTHER PUBLICATIONS

Alcatel-Lucent Shanghai Bell et al., "Proposals for X2 signalling enhancement for eCoMP," 3GPP Draft. vol. RAN WG1, Aug. 10, 2013.

(Continued)

*Primary Examiner* — Christopher Crutchfield
*Assistant Examiner* — Tito Pham
(74) *Attorney, Agent, or Firm* — Harness, Dickey & Pierce, P.L.C.

(57) ABSTRACT

At least one example embodiment discloses a method of scheduling communications in a network having a plurality of base stations covering cells, respectively. The method includes obtaining a first coordination matrix, by a first base station, based on channel state information from at least one user equipment (UE), the first coordination matrix indicating scheduling information and first weights associated with subband transmissions for the first base station, transmitting the first coordination matrix to at least another base station of the plurality of base stations, receiving, by the first base station, a second coordination matrix from the at least another base station, the second coordination matrix indicating second weights associated with subband transmissions for the second base station, and transmitting, by the first base station, in subbands where the associated first weights are greater than the associated second weights.

20 Claims, 3 Drawing Sheets

(51) Int. Cl.
  *H04L 5/00*    (2006.01)
  *H04B 7/06*    (2006.01)
  *H04J 11/00*   (2006.01)
  *H04W 72/04*   (2009.01)

(52) U.S. Cl.
  CPC ....... H04L 5/0073 (2013.01); H04W 72/1226 (2013.01); H04B 7/0639 (2013.01); H04J 11/005 (2013.01); *H04L 5/0007* (2013.01); *H04W 72/0426* (2013.01)

(56) References Cited

U.S. PATENT DOCUMENTS

| | | | |
|---|---|---|---|
| 2013/0258895 A1* | 10/2013 | Kim | H04J 11/0056 370/252 |
| 2013/0279403 A1 | 10/2013 | Takaoka et al. | |
| 2013/0324117 A1* | 12/2013 | Kim | H04L 25/00 455/434 |
| 2014/0064247 A1* | 3/2014 | Teyeb | H04W 36/0083 370/331 |
| 2014/0185467 A1* | 7/2014 | Heo | H04W 52/54 370/252 |

OTHER PUBLICATIONS

Alcatel-Lucent et al., "Performance of coordinated beamforming with multiple PMI feedback," vol. RAN WG1, Feb. 18, 2010.
Qualcomm Inc., "High level views on CoMP," 3GPP Draft, vol. RAN WG1, Jan. 31, 2011.
Alcatel-Lucent et al., "Proposals for X2 signalling enhancement for eCoMP," 3GPP Draft, vol. RAN WG1, Sep. 28, 2013.

\* cited by examiner

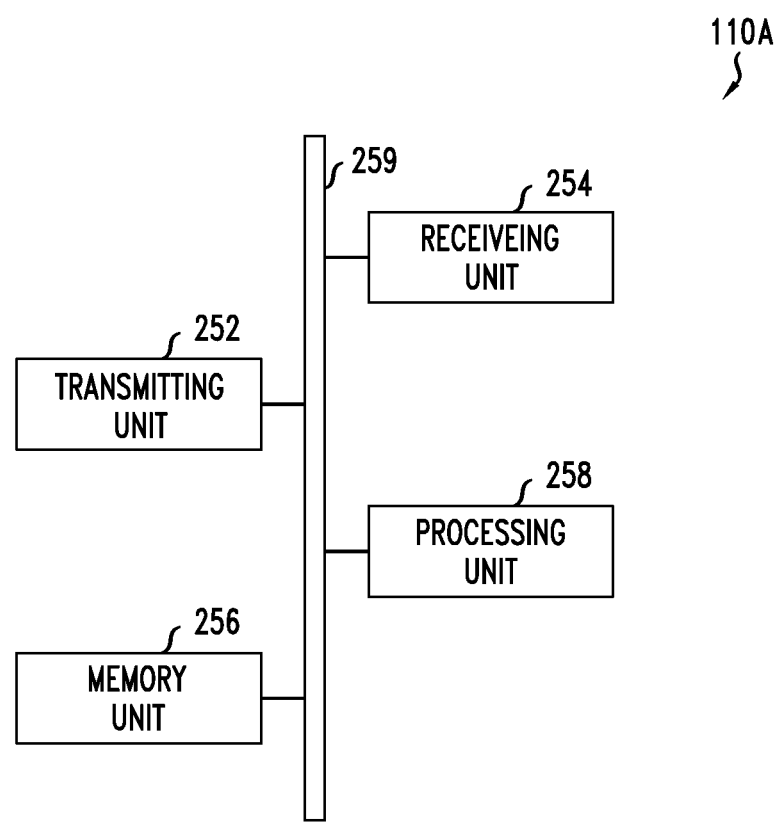

METHODS AND SYSTEMS FOR DISTRIBUTED COORDINATION

CROSS-REFERENCE TO RELATED APPLICATIONS

This non-provisional patent application claims priority under 35 U.S.C. §119(e) to provisional U.S. application No. 61/883,545 filed on Sep. 27, 2013 in the United States Patent and Trademark Office, the entire contents of which are incorporated herein by reference.

BACKGROUND

Wireless networks using the long-term evolution (LTE) standard may employ features, such as Carrier Aggregation (CA) and Coordinated Multi-Point Operation (CoMP), that allow UEs to be serviced by more than one base station. For example, when a UE works under the CA mode, the UE may be served by two or more cells, where one of the cells acts as a primary serving cell, and other cells act as secondary serving cells. Similarly, CoMP allows UEs to be served by more than one base station in order to enhance quality of service (QoS) on the perimeter of a serving cell.

Resource and spatial coordination are aspects of CoMP technologies in wireless communications to improve system capacity. Most of techniques in the CoMP technology developments use a centralized controller/scheduler for resource and spatial coordination among transmission points (TPs) in the CoMP cooperating set.

SUMMARY

The inventors have discovered methods for distributed coordination with a non-centralized scheduler.

At least one example embodiment discloses a method of distributed resource and spatial coordination with non-centralized schedulers. Each scheduler in a base station is in charge of its scheduling decision and takes into account schedules distributed from other schedulers in other base stations.

At least one example embodiment discloses a method of scheduling communications in a network having a plurality of base stations covering cells, respectively. The method includes obtaining a first coordination matrix, by a first base station, based on channel state information from at least one user equipment (UE), the first coordination matrix indicating scheduling information and first weights associated with subband transmissions for the first base station, transmitting the first coordination matrix to at least another base station of the plurality of base stations, receiving, by the first base station, a second coordination matrix from the at least another base station, the second coordination matrix indicating second weights associated with subband transmissions for the second base station, and transmitting, by the first base station, in subbands where the associated first weights are greater than the associated second weights.

In an example embodiment, the method includes determining the first weights based on feedback from the at least one UE, the feedback including at least one of precoding matrix indicator (PMI), channel quality indicator (CQI) and rank indicator (RI) feedback.

In an example embodiment, the determining the first weights is further based on at least one of buffer status, network load, user priority, traffic priority and cost index.

In an example embodiment, the determining the first weights includes receiving a weighting function from operations, administration and management (OAM), the first weights being based on the weighting function.

In an example embodiment, the weighting function allocates priority to the plurality of base stations.

In an example embodiment, the first coordination matrix indicates first precoding matrix indicators associated with the first base station and undesirable precoding matrix indicators associated with the at least another base station.

In an example embodiment, the second coordination matrix indicates second precoding matrix indicators.

In an example embodiment, the method further includes adjusting the scheduling information in subbands where one of the second precoding matrix indicators matches one of the undesirable precoding matrix indicators.

In an example embodiment, the first coordination matrix indicates at least one of first UE IDs associated with the first base station and undesirable UE IDs associated with the at least another base station.

In an example embodiment, the second coordination matrix indicates second UE IDs.

In an example embodiment, the method further includes adjusting the scheduling information in subbands where one of the second UE IDs matches one of the undesirable UE IDs where the associated first weights are less than the associated second weights.

In an example embodiment, the first coordination matrix indicates at least one of first transmit power levels associated with the first base station and undesirable transmit power levels associated with the at least another base station.

In an example embodiment, the second coordination matrix indicates second transmit power levels.

In an example embodiment, the method further includes adjusting the scheduling information where the associated first weights are less than the associated second weights, the scheduling information indicating transmission power levels for the subbands where the associated first weights are less than the associated second weights.

In an example embodiment, the first coordination matrix indicates first precoding matrix indicators associated with the first base station and desirable precoding matrix indicators associated with the at least another base station.

In an example embodiment, the first coordination matrix indicates first UE IDs associated with the first base station and desirable UE IDs associated with the at least another base station.

In an example embodiment, the first coordination matrix indicates first transmission power levels associated with the first base station and desirable transmission power levels associated with the at least another base station.

In an example embodiment, the method further includes adjusting the scheduling information in subbands where the associated first weights are less than the associated second weights.

In an example embodiment, the first coordination matrix is based on information not directly from other base stations.

At least one example embodiment discloses a base station including a memory and a processor configured to obtain a first coordination matrix based on channel state information from at least one user equipment (UE), the first coordination matrix indicating scheduling information and first weights associated with subband transmissions for the base station, a transmitter configured to transmit the first coordination matrix to at least another base station of the plurality of base stations, and a receiver configured to receive a second coordination matrix from the at least another base station, the second coordination matrix indicating second weights associated with subband transmissions for the second base station, and the transmitter being further configured to transmit in subbands where the associated first weights are greater than the associated second weights.

In an example embodiment, the processor is configured to determine the first weights based on feedback from the at least one UE, the feedback including at least one of precoding matrix indicator (PMI), channel quality indicator (CQI) and rank indicator (RI) feedback.

In an example embodiment, the processor is configured to determine further based on at least one of buffer status, network load, user priority, traffic priority and cost index.

In an example embodiment, the processor is configured to determine the first weights based on a weighting function from OAM, the first weights being based on the weighting function.

In an example embodiment, the weighting function allocates priority to the plurality of base stations.

In an example embodiment, the first coordination matrix indicates first precoding matrix indicators associated with the first base station and undesirable precoding matrix indicators associated with the at least another base station.

In an example embodiment, the second coordination matrix indicates second precoding matrix indicators.

In an example embodiment, the processor is configured to adjust the scheduling information where the associated first weights are less than the associated second weights, the scheduling information indicating transmission power levels for the subbands where the associated first weights are less than the associated second weights.

In an example embodiment, the first coordination matrix indicates at least one of a first UE IDs associated with the first base station and undesirable UE IDs associated with the at least another base station.

In an example embodiment, the second coordination matrix indicates second UE IDs.

In an example embodiment, the processor is configured to adjust the scheduling information in subbands where one of the second UE IDs matches one of the undesirable UE IDs where the associated first weights are less than the associated second weights.

In an example embodiment, the first coordination matrix indicates at least one of first transmit power levels associated with the first base station and undesirable transmit power levels associated with the at least another base station.

In an example embodiment, the second coordination matrix indicates second transmit power levels.

In an example embodiment, the processor is configured to adjust the scheduling information for transmission power levels of subbands where the associated first weights are less than the associated second weights.

In an example embodiment, the first coordination matrix indicates first precoding matrix indicators associated with the first base station and desirable precoding matrix indicators associated with the at least another base station.

In an example embodiment, the first coordination matrix indicates first UE IDs associated with the first base station and desirable UE IDs associated with the at least another base station.

In an example embodiment, the first coordination matrix indicates first transmission power levels associated with the first base station and desirable transmission power levels associated with the at least another base station.

In an example embodiment, the processor is configured to adjust the scheduling information in subbands where the associated first weights are less than the associated second weights.

In an example embodiment, the first coordination matrix is based on information not directly from other base stations.

BRIEF DESCRIPTION OF THE DRAWINGS

Example embodiments will be more clearly understood from the following detailed description taken in conjunction with the accompanying drawings. FIGS. 1-3 represent non-limiting, example embodiments as described herein.

FIG. 1 illustrates a wireless communication system according to an example embodiment;

FIG. 2 illustrates a method of scheduling communications in a network having a plurality of base stations covering cells, respectively, according to an example embodiment; and FIG. 3 illustrates an example embodiment of a base station shown in FIG. 1.

DETAILED DESCRIPTION

Figure 1:
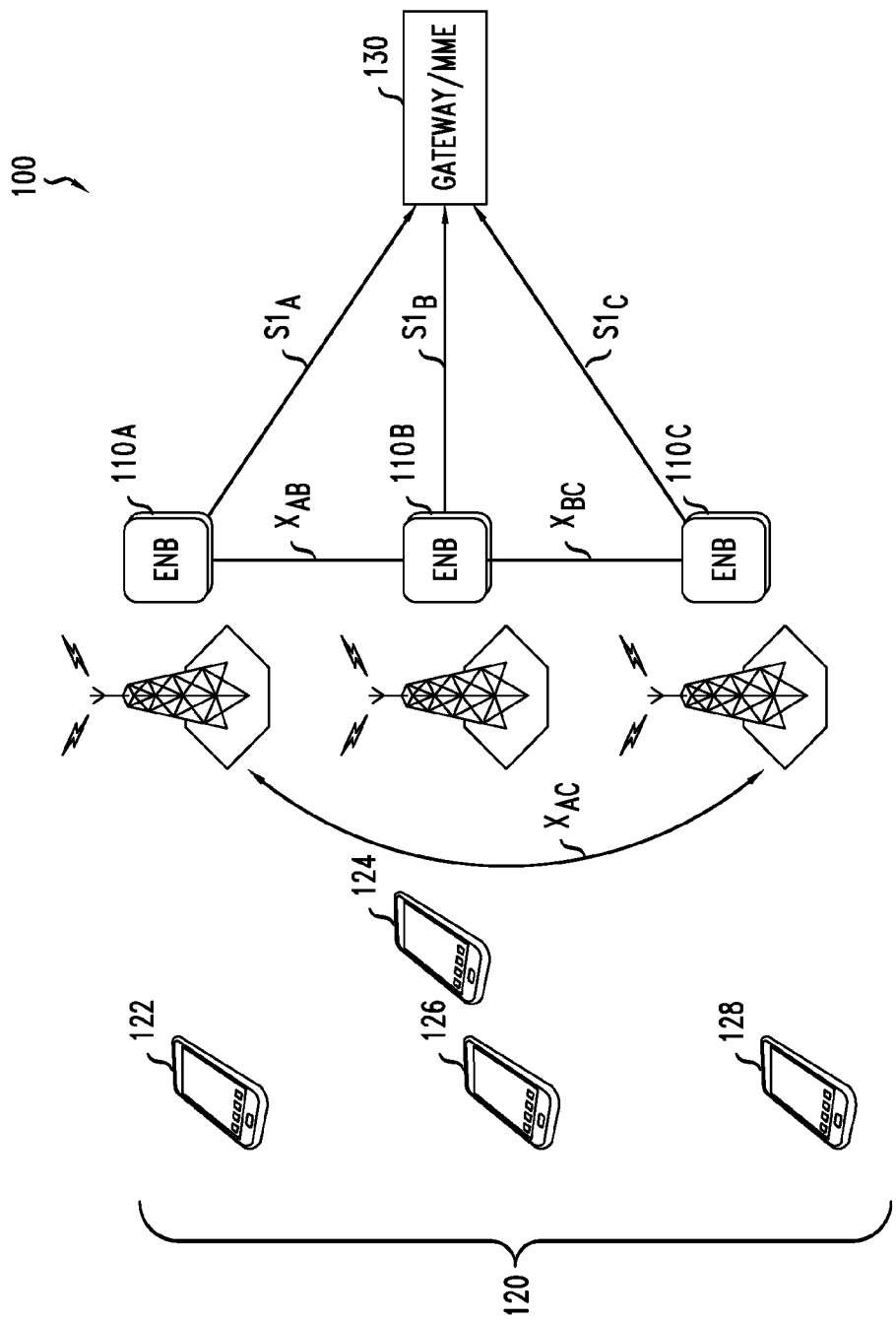

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

FIG. 1 illustrates a system according to an example embodiment. A wireless communications system 100 may follow, for example, a Long Term Evolution (LTE) protocol. It should be understood that example embodiments are not limited to LTE.

Wireless communications system 100 includes a first eNB 110A; a second eNB 110B; a third eNB 110C; a plurality of user equipments (UEs) 120 including first UE 122; second UE 124; third UE 126; and fourth UE 128; a Gateway/MME 130. Each eNB 110A-110C may have a coverage area which may be a single cell or a plurality of cells.

The gateway/MME 130 may include one or more processors and an associated memory operating together to achieve their respective functionality. The gateway/MME 130 may include one or more mobility management entities (MME), a Home eNB Gateway, a security gateway and/or one or more operations, administration and management (OAM) nodes (not shown). For the convenience of illustration, the gateway/MME 130 is illustrated as a single node, however, it should be understood that the gateway/MME 130 may be represented as separate nodes.

It should be noted that the wireless communications system 100 is not limited to the features shown therein. These features are shown for explanation of example embodiments. It should be understood that the wireless communications system 100 may include common LTE features such as a home subscriber server (HSS), an Off-line charging System (OFCS), a serving gateway (S-GW), and a public data network (PDN) gateway (P-GW).

The UEs 120 may be in wireless communication with at least a respective one of the first eNB 110A, the second eNB 110B and the third eNB 110C. The UEs 120 may be, for example, mobile phones, smart phones, computers, or personal digital assistants (PDAs). The first eNB 110A, the second eNB 110B and the third eNB 110C communicate with each other over X2 interfaces. More specifically, the first eNB 110A and the second eNB 110B communicate over an X2 interface $X_{AB}$, the third eNB 110C and the second eNB 110B communicate over an X2 interface $X_{BC}$ and the first eNB 110A and the third eNB 110C communicate over an X2 interface $X_{AC}$.

The X2 interface is defined by 3GPP standards. Therefore, for the sake of brevity, the X2 interfaces $X_{AB}$, $X_{BC}$ and $X_{AC}$ will not be described in greater detail.

The gateway/MME 130 communicates with the first eNB 110A, the second eNB 110B and the third eNB 110C over S1 interfaces $S1_A$, $S1_B$ and $S1_C$, respectively.

The eNBs 110A-110C are configured to perform distributed coordination.

Each base station (e.g., eNBs 110A-110C) performs a scheduling decision independently with a coordination policy as a constraint. Each base station performs a provisional scheduling algorithm, such as proportionally fair, maximum C/I (carrier-to-interference) algorithm, without the constraint using known algorithms The scheduling decisions, such as resource allocation, precoding vectors of a serving eNB, and companion precoding matrix indicator (PMI) from neighboring eNBs in the cooperating set, are exchanged between adjacent eNBs. Each eNB is provisioned with the coordination policy through an OAM interface by an operator.

Each eNB 110A-110C re-computes the scheduling algorithm based on the coordination policy and scheduling decisions from neighboring cells to achieve the common target of resource and spatial coordination.

The coordination policy defines a control function of each eNB for resource and spatial coordination and a weighting function $Wi_{i,j,c}$ at each eNB in a CoMP cooperating set to be incorporated into the computation of a scheduling matrix, where i is a subframe index, j is a subband index and c is the cell. A cooperating set is defined when the UE reports the signal strengths of neighboring cell(s) are above the configured threshold. Using FIG. 1 as an example, the eNBs 110A-110C may be considered a cooperating set.

As should be understood, a subband is a portion of an operating system bandwidth within which frames containing information bits, arranged as per a particular format, are conveyed. A subframe is a portion of a frame. A combination of a sub-frame and a subband is a set of resource block pairs.

The weighting function $W_{i,j,c}$ with other scheduling decisions, such as resource allocation and precoding matrix, are specified in an information element to be exchanged between eNBs in the cooperating set. The control function will enforce each eNB in the CoMP cooperating set to follow the coordination policy provisioned in advance. The control function is a set of rules for all eNBs in the cluster for coordination among schedulers. For example, the control function may follow a round robin rule where a rank is generated among eNBs in the cluster. A highest rank eNB would allocate resources first, then the second highest ranked eNB and so until the last eNB with the lowest rank for a given subframe. At a next subframe, the first eNB would move to the bottom of rank and all other eNBs move up 1 rank. The coordination policy may be the same for each eNB in a CoMP cluster, e.g., aligned by OAM, otherwise the interpretation of weighting may be diverse among the eNBs. The control and weighting functions $W_{i,j,c}$ could be time variant functions of variables, such as traffic arrivals and system load.

Distributed coordination for CoMP coordinating scheduling/beamforming are based on the coordinating policy and initial preliminary scheduling decision from each eNB in the cooperating set. The control function defines the rule for each eNB to follow after receiving a scheduling matrix and channel state information from each eNB 110A-110C in the cooperating set.

In distributed coordination, each eNB 110A-110C incorporates the initial scheduling matrices, UE feedbacks (such as CQI/PMI/RI and companion PMIs) and weighting functions $W_{i,j,c}$ from neighboring cells in the cooperating set to the scheduler algorithm as the constraint for scheduling.

The eNBs 110A-110C use the weighting function $W_{i,j,c}$ to decide the priority of the scheduling matrix at each scheduling instance when multiple scheduling matrices from the CoMP cooperating set are received. The weighting function $W_{i,j,c}$ in the distributed coordination is used by each eNB 110A-110C to determine who has higher priority in the scheduling decision for resource and spatial coordination. The eNB with the highest weight for the scheduled subband in the cooperating set retains its resource allocation and the preference of precoding vector.

The eNBs with a lower weighting adjust the scheduling matrix adjusting the resource allocation, precoding vector, and/or transmitted power, to minimize the interference to the eNBs with a higher weight The weighting function $W_{i,j,c}$ is a function of achievable rate without resource or spatial coordination.

$$W_{i,j,c} = f(R_{i,j,c}, \Delta_c), \text{ where} \begin{cases} i = \text{subframe index} \\ j = \text{subband index} \\ c = \text{cell index} \end{cases}$$

The achievable rate, $R_{i,j,c}$ is derived from a UE's CQI/PMI/RI (channel quality indicator/pre-coding matrix indicator/rank indicator) feedbacks with a given transmission power and interference. The delta function, $\Delta c$, is an additional function for the robust traffic arrival and different type of users, such as Buffer Status (B), system load (L), user priority (U), traffic priority (T), and cost index (q.

$$\Delta = g(B, L, U, T, C).$$

The achievable rate, weighting function, and delta function are derived by a scheduler at each eNB.

The delta function $\Delta c$ may be a time variant function based on the traffic arrival and system load. The delta function $\Delta c$ may be a step increasing function to get higher priority in resource and spatial coordination when the cell load is over a threshold configured by operator. The delta function $\Delta c$ could also be defined as extra bonus weight for preferred users.

The weighting function $W_{i,j,c}$ may be specified by vendor or operator by OAM. Such a weighting function $W_{i,j,c}$ can be specified with a cell-specific manner if necessary in order to prioritize or de-prioritize certain cells for better coverage or UE experience. Different types of weighting functions $W_{i,j,c}$ can be provided by OAM to facilitate different prioritization strategies, e.g. PF-type weighting function, upperbound-limited weighting function, etc.

Procedures of distributed coordination for CS/CB (coordinated scheduling/coordinated beamforming) are described below. The example given below is for facilitating beam coordination. However, example embodiments can be easily extended to do other types of coordination by replacing PMI information with others, e.g. with transmission power or estimated PL from each cell which becomes CoMP semi-static/dynamic point muting, or with Cell IDs from each cell where some UEs become more desirable or undesirable to be allocated in given physical resource blocks (PRBs). Other schemes may be implemented by sharing/exchanging a combination of information, or multiple coordination matrices where each matrix is dedicated for one type of information sharing and individual weighting value. The type of information sharing can be pre-configured in OAM.

Each eNB 110A-110c performs an initial scheduling decision based on UEs' CSI (channel state information) feedbacks without resource and spatial coordination and the associated weighting function $W_{i,j,c}$. Then, each eNB sends the coordination matrix, such as scheduling decisions, PMIs, and weighting vectors, to the neighboring cells in the CoMP cooperating set The coordination matrix contains subband scheduling information ($sb_{i,c}$), PMIs of the serving cell and neighboring cells ($PMI_{i,c}$) and a weighting vector ($W_{i,c}$). An example of a coordination matrix of eNB 110A (cell 1) is shown below.

$$\text{Cell 1} \begin{matrix} sb_{1,1} & PMI_{1,1} & PMI_{1,2} & 0 & W_{1,1} \\ sb_{2,1} & PMI_{2,1} & 0 & 0 & W_{2,1} \\ sb_{3,1} & PMI_{3,1} & PMI_{3,2} & PMI_{3,3} & W_{3,1} \\ & & \vdots & & \\ sb_{N,1} & PMI_{N,1} & 0 & PMI_{N,3} & W_{N,1} \end{matrix}$$

Since a CoMP cooperating set is a UE-specific configuration, each eNB will send scheduling decisions to all neighboring eNBs. Each subband scheduling decision contains resource blocks and the serving cell PMI and worst companion PMIs from the associated neighboring cells. If any UE is configured with multiple CSI processes for CoMP coordination, all PMIs of non-serving cells are included in the coordination matrix.

$PMI_{1,1}$ $PMI_{2,1}$, $PMI_{N,1}$ refer to serving cell PMIs. If a PMI equals zero, the corresponding subband and cell is free to be used by all neighboring eNBs. $PMI_{1,2}$, $PMI_{3,2}$, $PMI_{3,3}$, $PMI_{N,3}$ are PMIs (the worst companion PMI for CS/CB or best companion PMI for DPS (dynamic point selection) and JT (joint transmission)) that neighboring cells should take into consideration. Note that they can be the best companion PMI if the type of information sharing is pre-configured in OAM. If it equals to zero, the corresponding subband has no spatial restriction for the specific neighboring cell. It should be understood that $PMI_{i,c}$ may contain a single PMI index or multiple indices, or single set index for multiple PMIs, in the event that there may be more than one worst/best companion PMIs.

Each eNB 110A-110C re-computes their scheduling matrix based on the weighting vector after the coordination matrices from neighboring cells are received. The scheduling matrix is a set of parameters for the scheduler to incorporate for the scheduling decision.

If the weighting vector is higher than neighboring weighting vectors, the serving cell has the highest priority and will keep its resource and precoding vector of the subband. The neighboring eNBs will adjust the scheduling to reduce the interference after the neighboring eNBs have received the serving eNB's scheduling matrix. If the serving eNB determines that one neighboring eNB in the CoMP cooperating set in the given subband has a higher weighting vector than that of the serving eNB, the serving eNB adjusts the scheduling decision if the scheduled PMI is the worst companion PMI of the neighboring eNB, for example, $PMI_{1,2}$, $PMI_{3,2}$ or $PMI_{3,3}$. The serving eNB may allocate the resource to another UE in a ranking list of the subband with a preferred PMI, as shown in the coordination matrix above. Additionally, the serving eNB may move the resource allocation of the UE to another subband.

The serving eNB is configured to determine if two neighboring eNBs in the CoMP cooperating set in a given subband have higher weighting vectors than that of the serving eNB. The serving eNB adjusts the scheduling decision if the corresponding PMI of the serving eNB is the worst companion PMI of either one of the neighboring eNBs. Worst companion PMI is the PMI from a neighboring cell to create the most interference to the specific UE. If the PMI is not the worst companion, the interference will not be the worst for the given UE.

When the corresponding PMI of the serving eNB is the worst companion PMI of either one of the neighboring eNBs, the serving eNB allocates the resource to another UE in the ranking list of the subband with a preferred PMI. The serving eNB may move the resource allocation of the UE to another subband and repeat the process for all subbands.

Figure 2:
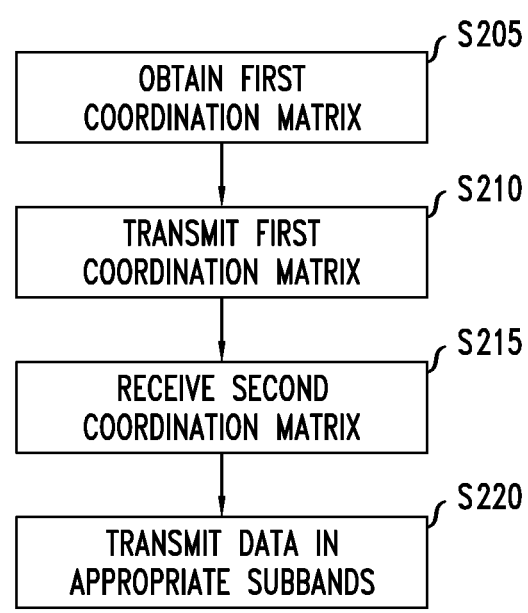

FIG. 2 illustrates a method of scheduling communications in a network having a plurality of base stations covering cells, respectively. The method of FIG. 2 may be performed by any of the eNBs 110A-110C, as described above.

At S205, the eNB obtains a first coordination matrix based on channel state information from at least one user equipment (UE), the first coordination matrix indicating scheduling information and first weights associated with subband transmissions for the base station. At S210, the eNB transmits the first coordination matrix to at least another base station of the plurality of base stations. At S215, the eNB receives a second coordination matrix from the at least another base station, the second coordination matrix indicating second weights associated with subband transmissions for the second base station. At S220, the eNB transmits data in subbands where the associated first weights are greater than the associated second weights.

FIG. 3 illustrates an example embodiment of the macro eNB 110A. It should be also understood that the macro eNB 110A may include features not shown in FIG. 3 and should not be limited to those features that are shown.

Referring to FIG. 3, the base station 110A may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in the wireless communications network 100.

The receiving unit 254 is a device that includes hardware and any necessary software for receiving wireless signals including, for example, data signals, control signals, and signal strength/quality information via one or more wireless connections to other network elements in the network 100.

The memory unit 256 may be any device capable of storing data including magnetic storage, flash storage, etc. The memory unit 256 is used for data and controlling signal buffering and storing for supporting pre-scheduling and the scheduled data transmissions and re-transmissions.

The processing unit 258 may be any device capable of processing data including, for example, a microprocessor configured to carry out specific operations based on input data, or capable of executing instructions included in computer readable code. The processing unit 258 may include a scheduler.

For example, the processing unit 258 is capable of obtaining a first coordination matrix, by a first base station, based on channel state information from at least one user equipment (UE), the first coordination matrix indicating scheduling information and first weights associated with subband transmissions for the first base station. Furthermore, the processing unit 258 is configured to adjust the scheduling of the macro eNB 110A.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of scheduling communications in a network having a plurality of base stations covering cells, respectively, the method comprising:
   determining first weights based on feedback from at least one user equipment (UE), the feedback including at least one of precoding matrix indicator (PMI), channel quality indicator (COI) and rank indicator (RI) feedback, the determining including,
      receiving a weighting function configured by an operations, administration and management (OAM) function, the first weights being based on the weighting function, the weighting function being associated with at least one subframe, at least one subband and at least one of the cells;
   obtaining a first coordination matrix, by a first base station, based on channel state information from the at least one, the first coordination matrix indicating scheduling information and first weights associated with subband transmissions for the first base station;
   transmitting, by the first base station, the first coordination matrix to at least another base station of the plurality of base stations;
   receiving, by the first base station, a second coordination matrix from the at least another base station, the second coordination matrix indicating second weights associated with subband transmissions for the at least another base station; and
   transmitting, by the first base station, data in subbands where the associated first weights are greater than the associated second weights.

2. The method of claim 1, wherein the step of determining the first weights is further based on at least one of buffer status, network load, user priority, traffic priority and cost index.

3. The method of claim 1, wherein the plurality of base stations are in a cooperating set and the weighting function allocates priority to the plurality of base stations within the cooperating set.

4. The method of claim 1, wherein the first coordination matrix indicates first precoding matrix indicators associated with the first base station and undesirable precoding matrix indicators associated with the at least another base station.

5. The method of claim 4, wherein the second coordination matrix indicates second precoding matrix indicators.

6. The method of claim 5, further comprising:
   adjusting the scheduling information in subbands where one of the second precoding matrix indicators matches one of the undesirable precoding matrix indicators where the associated first weights are less than the associated second weights.

7. The method of claim 1, wherein the first coordination matrix indicates at least one of first UE IDs associated with the first base station and undesirable UE IDs associated with the at least another base station.

8. The method of claim 7, wherein the second coordination matrix indicates second UE IDs.

9. The method of claim 8, further comprising:
   adjusting the scheduling information in subbands where one of the second UE IDs matches one of the undesirable UE IDs where the associated first weights are less than the associated second weights.

10. The method of claim 1, wherein the first coordination matrix indicates at least one of first transmit power levels associated with the first base station and undesirable transmit power levels associated with the at least another base station.

11. The method of claim 10, wherein the second coordination matrix indicates second transmit power levels.

12. The method of claim 11, further comprising:
    adjusting the scheduling information where the associated first weights are less than the associated second weights, the scheduling information indicating transmission power levels for the subbands where the associated first weights are less than the associated second weights.

13. The method of claim 1, wherein the first coordination matrix indicates first precoding matrix indicators associated with the first base station and desirable precoding matrix indicators associated with the at least another base station.

14. The method of claim 1, wherein the first coordination matrix indicates first UE IDs associated with the first base station and desirable UE IDs associated with the at least another base station.

15. The method of claim 1, wherein the first coordination matrix indicates first transmission power levels associated with the first base station and desirable transmission power levels associated with the at least another base station.

16. The method of claim 1, further comprising:
    adjusting the scheduling information in subbands where the associated first weights are less than the associated second weights.

17. The method of claim 1, wherein the first coordination matrix is based on information not directly from other base stations.

18. The method of claim 1, wherein the weighting function is a function of achievable rate without resource or spatial coordination.

19. The method of claim 18, wherein the weighting function is also a function of a step function that increases in accordance with a priority of the first base station.

20. A base station in a network, the base station comprising:
    a processor configured to,
       determine first weights based on feedback from at least one user equipment (UE), the feedback including at least one of precoding matrix indicator (PMI), channel quality indicator (COI) and rank indicator (RI) feedback, the determining including,
receive a weighting function configured by an operations, administration and management (OAM) function, the first weights being based on the weighting function, the weighting function being associated with at least one subframe, at least one subband and at least one of the cells, obtain a first coordination matrix based on channel state information from the at least one, the first coordination matrix indicating scheduling information and first weights associated with subband transmissions for the base station, transmit the first coordination matrix to at least another base station of a plurality of other base stations in the network, receive a second coordination matrix from the at least another base station, the second coordination matrix indicating second weights associated with subband transmissions for the at least another base station, and transmit data in subbands where the associated first weights are greater than the associated second weights.

* * * * *